United States Patent [19]

Gaia

[11] Patent Number: 4,597,877

[45] Date of Patent: Jul. 1, 1986

[54] PROCESS AND EQUIPMENT FOR WATER TREATMENT

[75] Inventor: Franco Gaia, Caslano, Switzerland

[73] Assignee: BBC Brown, Boveri & Company, Ltd., Baden, Switzerland

[21] Appl. No.: 696,489

[22] Filed: Jan. 30, 1985

[30] Foreign Application Priority Data

Feb. 23, 1984 [CH] Switzerland ............... 885/84

[51] Int. Cl.$^4$ ............................................. C02F 1/78
[52] U.S. Cl. ..................... 210/750; 210/758; 210/760; 210/194; 210/218; 210/188; 261/36 R; 261/DIG. 75
[58] Field of Search ............... 210/754, 760, 192, 220, 210/194, 750, 758, 188, 218; 261/DIG. 75, 36 R

[56] References Cited

U.S. PATENT DOCUMENTS

| | | | |
|---|---|---|---|
| 996,560 | 6/1911 | Bradley | 210/192 |
| 1,124,601 | 1/1915 | Franklin | 210/192 |
| 3,562,349 | 2/1971 | Pawloski et al. | 261/36 R |
| 3,840,216 | 10/1974 | Smith et al. | 261/DIG. 75 |
| 3,847,748 | 11/1974 | Gibson et al. | 210/220 |
| 4,042,510 | 8/1977 | Sullins | 261/DIG. 75 |

FOREIGN PATENT DOCUMENTS

| | | | |
|---|---|---|---|
| 2357484 | 2/1978 | France | 210/194 |
| 2367023 | 6/1978 | France | 210/192 |

Primary Examiner—Benoit Castel
Attorney, Agent, or Firm—Oblon, Fisher, Spivak, McClelland & Maier

[57] ABSTRACT

When treating water with ozone, chlorine or similar reagents, the problem arises of introducing the gas as inexpensively as possible at the extraction point which is frequently located in a considerable depth of water—typically 30 to 59 meters. It is proposed that the gas be introduced into a bubble column downflow reactor (7) in the region close to the surface by means of a mixer and the gas bubbles forming there be passed against buoyancy through the reactor to the lower end of the riser (3) of the pump arrangement, where it is intimately mixed with the fresh water drawn in. After passing through a gas separator (8) and a pump, a part of the heated water is recycled to the mixer (8).

9 Claims, 1 Drawing Figure

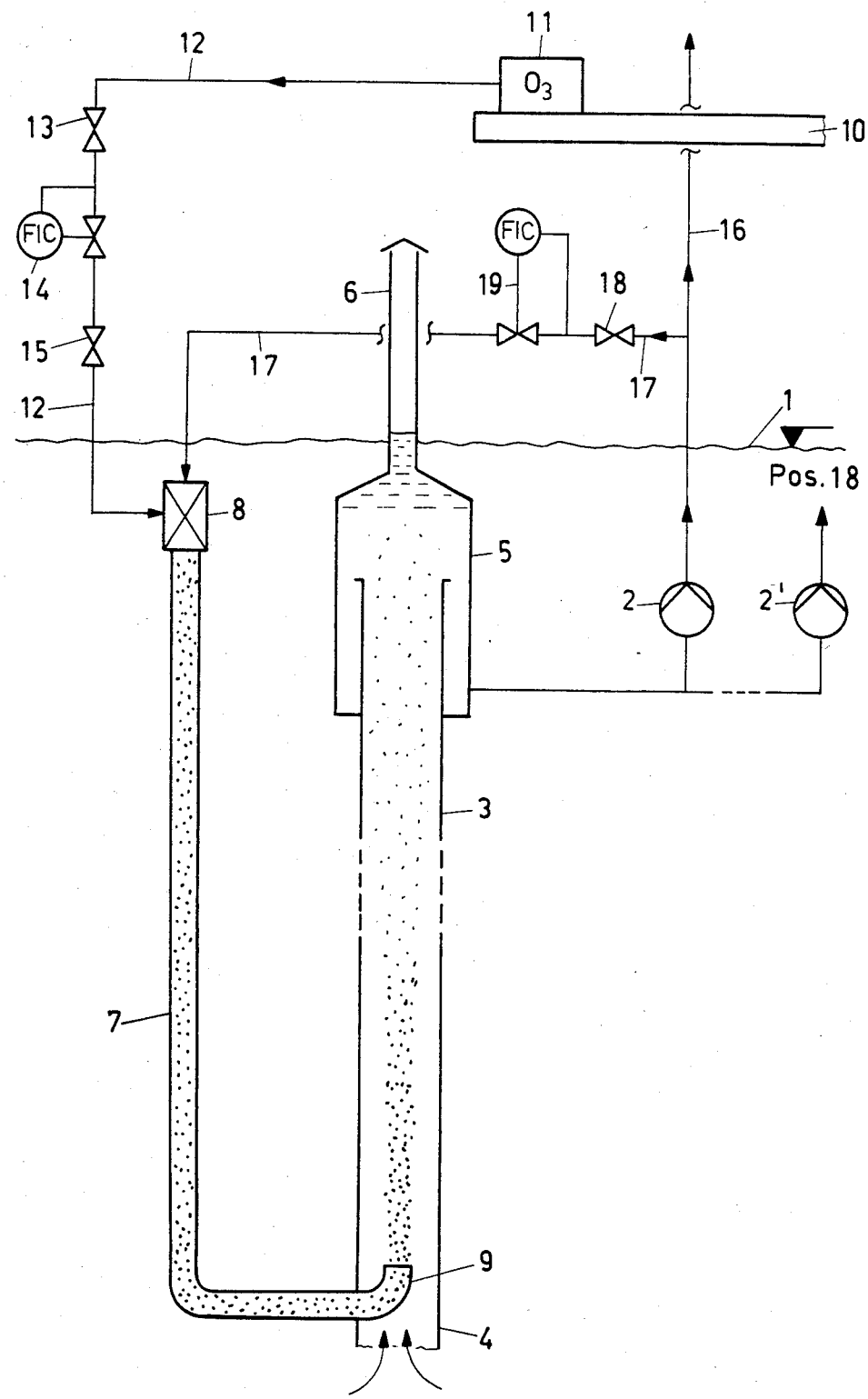

PROCESS AND EQUIPMENT FOR WATER TREATMENT

BACKGROUND OF THE INVENTION

Field of the Invention

The invention relates to a process for water treatment and to equipment for carrying out the process.

In the treatment of water to give drinking water or for process engineering purposes in off-shore technology, a gaseous or liquid reagent is added to the water, which is pumped up from depths of 30 up to more than 50 meters, in order to make it suitable for the particular intended use.

In a known process, chlorine, ozone, ozone-containing air or a liquid or solution is admixed to the water at the lower end of the pump riser, which reagents then effect the desired treatment of the water in the riser itself and in the downstream parts of the unit.

The admixture of gases here raises the problem that, with increasing water depths, the gas or gas mixture must be comparatively highly compressed, which causes difficulties particularly in the case of ozone or ozone-containing gases, since a part of the ozone decomposes again on compression.

SUMMARY OF THE INVENTION

The invention has as its object a process which does not have such drawbacks and is distinguished by being economical.

A further object of the invention is the provision of equipment suitable for carrying out the process according to the invention.

As a result of the series arrangement, according to the invention, of virtually three treatment stages—mixing in the mixer itself, bubble column downflow reactor and riser of the pump arrangement—intimate thorough mixing is obtained over a comparatively long treatment distance. The problems with compression and introduction of the gas at a great water depth disappear. In terms of energy, only friction losses of the flowing liquid must be accepted.

In the mixing stage, conventional mixers can readily be used, that is to say, for example, injectors, starting mixers, diffusors or turbine mixers, and their selection may depend only on the quality of bubble formation.

In the second treatment stage, namely the bubble column downflow reactor, the gas or gas mixture is conveyed to virtually any desired water depth, solely by the flow of the water. Due to the increasing water pressure, the bubble diameter admittedly decreases with increasing depth, but this precisely favours the mass transfer between gas and water in an advantageous manner. This mass transfer continues in the riser of the pump arrangement over a long distance, favoured by the admixture of the pretreated water, containing bubbles, to the fresh water.

The equipment according to the invention for carrying out the process can easily be realised, in particular in off-shore technology installations, since it has a small space requirement on deck and the reactors can advantageously be designed as pipes of appropriate length, which are anchored on the support columns of the platform.

BRIEF DESCRIPTION OF THE DRAWING

Further advantages and special embodiments of the invention are evident from the dependent claims in conjunction with the description below of an illustrative embodiment, by reference to which the process according to the invention will also be explained in greater detail.

The sole FIGURE in the drawing diagrammatically shows a unit for treating water with gaseous substances, such as is carried out in off-shore technology.

DETAILED DESCRIPTION OF THE PREFERRED EMBODIMENT

A pump 2 with a riser 3 is arranged at about 8 to 10 meters depth below sea level 1. The lower end 4 of the riser ends at a depth of 35 to 50 meters. A gas separator 5 with a stack 6 ending above the maximum sea level is provided at the upper end of the riser 3. Next to the riser 3, a second pipe 7 of smaller cross-section is located, which pipe carries at its upper end a mixer 8 and the lower end of which is bent towards the riser, passes through the wall at the lower end 4 of the riser and has an upward-pointing nozzle 9 located at the centre in the riser 3. An ozone generator 11 is located on the deck of a platform 10 which is not shown in greater detail. The ozone generated therein or the gas mixture enriched with ozone is fed via a line 12, a first valve 13, a flow controller 14 and a second valve 15 to the gas inlet of the mixer 8. The riser 3 and the pipe 7 are preferably of the same length and the riser preferably has a sectional area between 3 and 10 times that of the pipe 7.

The major part of the treated water delivered from the gas separator 5 by the pump 2 is fed via a line 16 to the intended use, for example cooling of the the equipment on the platform, etc. A minor part, typically 10 to 20%, passes via a branch line 17, a valve 18 and a flow controller 19 to the liquid inlet of the mixer 8.

The mode of action of the unit described is as follows:

A metered rate of ozone per unit time is admixed in the mixer 8 to the water fed in via line 17. Already in the mixer, gas bubbles form which are entrained against gravity by the downward water flow. The flow velocity of the water is set such that it is greater than the rate of rise of the bubbles due to buoyancy and is above 0.3 m/second, preferably between 0.5 and 1 m/second.

Already in the mixer 8 and, to an even greater extent, in the pipe 7 which, in conjunction with the mixer 8, can be regarded as a bubble column downflow reactor (compare Chem.-Ing. Tech. 50 (1978), No. 12, pages 944–947, Verlag Chemie, Weinheim), intensive mass transfer takes place, which is even accelerated by the decrease in the size of the gas bubbles with increasing water depth. After the water thus pretreated has entered the lower end of the riser 3, this water is mixed with the fresh water drawn in. In the course of the upward-directed flow in the pipe 3, further mass transfer then takes place. The residual gas passes into the open via the stack 6, whereas the liquid is delivered by the pump 2 and the line 16 to the platform 10.

The flow controller 19 is set such that between 10 and 30% of the water rate delivered by the pump 2 are recycled to the mixer 8.

After the starting phase of the unit, a quasisteady state is established, in which treated water is fed to the mixer 8 and enriched there with ozone or ozone-containing gas, for example ozone-containing air. It is clear that, in order to maintain the enrichment circulation arranged in parallel to the pump arrangement and consisting of the line 17, the mixer 8 and the pipe 7, only comparatively little power must be expended here, since essentially only friction resistances have to be overcome.

The gas feed flow controller 14 arranged in the course of the line 12, in conjunction with the flow control of the recirculated (treated) water, makes the unit 5 independent of the sea level 1.

The actual construction of the unit is relatively simple, inasmuch as the two reactors, the pipe 7 and the riser 3 can be fixed without great expense to the supports of the platform 10, which are present anyway. Due to the existence of the riser of the pump arrangement, even a modification of an existing unit is inexpensive.

The process according to the invention was described by reference to an off-shore unit. It is of course within the scope of the invention to use the process in units for the preparation of drinking water from lakes. Moreover, a different treatment gas, for example chlorine, can be used instead of ozone or an ozone-containing gas mixture.

Furthermore, the spatial arrangement of the pipes 7 and 3 can be varied in accordance with requirements. Thus, for example, the riser 3 can be located concentrically in the interior of the pipe 7 of the bubble column downflow reactor, or vice versa. It is also possible to arrange several pipes 7 in the interior of the riser 3. As a further alternative, several pipes 7 of correspondingly smaller diameter can concentrically surround the riser 3 and be supported on the latter.

If each pipe 7, that is to say each bubble column downflow reactor, is then provided with its own pump, and all these pumps then deliver into the line 16—the branch line 17 then still branches off from this "main" 16—the output of the complete unit can then be adapted to different operational requirements in a simple manner, by switching one or more pumps on or off.

Since the pressure drop in the circuit comprising the line 17, the valve 18, the flow controller 19, the mixer 8 and the pipe 7 up to the nozzle 9, is very small, this circuit can advantageously be supplied via an auxiliary pump 2', connected parallel to the pump 2, of smaller output and smaller delivery head, instead of via the branch line 17. This is clearly indicated in the figure, by way of example. The line connection between the line 16 and the valve 18 is omitted, and the delivery side of the auxiliary pump 2' is directly connected to the valve 18.

I claim:

1. A process for treating water with a gaseous substance, comprising the steps of:
   using a mixer immersed in a body of water to mix water with a gaseous substance to form a mixture of water and said gaseous substance;
   causing said mixture including bubbles of said gaseous substance to flow downward through bubble column downflow reactor means extending substantially vertically and immersed in a body of water, said downward flow being controlled to be at a velocity greater than 0.3 m/second and greater than a rate of rising of said bubbles, whereby said bubbles are compressed and mass transfer of said gaseous substance to said water takes place;
   introducing said mixture from a lower portion of said downflow reactor means to a lower portion of a riser having a sectional area greater than that of said reactor means, said riser extending substantially vertically and being immersed in said body of water, said lower portion of said riser permitting direct entry of said water from said body of water so that fresh water from said body of water may be drawn into said riser;
   permitting said mixture to rise in said riser and mix with said water in said riser, whereby further mass transfer of said gaseous substance takes place;
   separating residual gaseous substance from treated water of said mixture which has risen through said riser;
   using a pump positioned below a surface of said body of water to pump said treated water to an intended use; and
   recycling a portion of said pumped treated water to said mixer.

2. Process according to claim 1 wherein between 10% and 30% of the water delivered by the pump is recycled to the bubble column downflow reactor.

3. Process according to claim 1 or 2 wherein said control of said flow velocity of the water in the bubble column downflow reactor is provided by use of a flow controller and is controlled to a value between 0.5 to 1 m/second.

4. The process of claim 1 wherein said gaseous substance is ozone.

5. The process of claim 1 wherein said intended use is above said surface.

6. An apparatus for treating water with a gaseous substance comprising:
   mixer means immersed within a body of water for mixing water with a gaseous substance to form a mixture of water and said gaseous substance;
   bubble column downflow reactor pipe means extending sustantially vertically and immersed within said body of water;
   means for causing said mixture including bubbles of said gaseous substance to flow downward through said downflow reactor pipe means, whereby mass transfer of said gaseous substance takes place;
   means for controlling a flow velocity of said mixture in said downflow reactor pipe means to be greater than a rate of rising of said bubbles;
   a riser extending substantially vertically and immersed within said body of water and having a sectional area greater than that of said reactor means, a lower part of said riser including means for permitting the direct entry therein of fresh water from said body of water;
   means for introducing said mixture from a lower portion of said downflow reactor pipe means to said lower part of said riser, whereby mixture rising in said riser mixes with said fresh water and further mass transfer of said gaseous substance takes place;
   separator means associate with an upper part of said riser for separating residual gaseous substance from treated water in said mixture;
   first pump means in said body of water for pumping said treated water from said separator means to an intended use; and
   means for recirculating a portion of said treated water from said separator to said mixer.

7. The apparatus of claim 6 wherein said riser and the bubble column downflow reactor pipe means have approximately the same length, and wherein the cross-sections thereof are in a ratio of 1:10 to 1:3.

8. The apparatus of claim 6 wherein said means for recirculating includes a second flow controller.

9. The apparatus of claim 8 wherein said means for recirculating includes a second pump means connected to said separator in parallel with said first pump means.

* * * * *